No. 845,413. PATENTED FEB. 26, 1907.
E. HAAGN.
ELECTRIC RESISTANCE THERMOMETER.
APPLICATION FILED SEPT. 22, 1906.
Fig. 1
Fig. 2
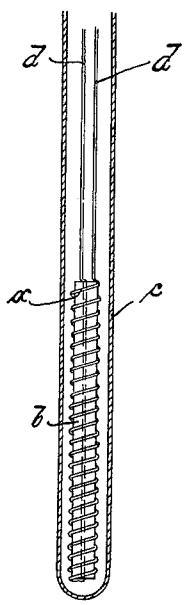
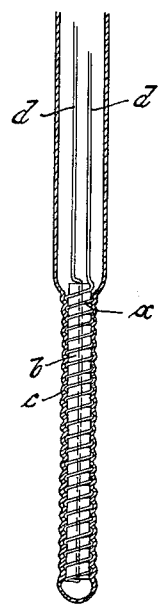

UNITED STATES PATENT OFFICE.

ERNST HAAGN, OF HANAU, GERMANY, ASSIGNOR TO THE FIRM OF W. C. HERAEUS, OF HANAU, GERMANY.

ELECTRIC-RESISTANCE THERMOMETER.

No. 845,413.	Specification of Letters Patent.	Patented Feb. 26, 1907.

Application filed September 22, 1906. Serial No. 335,825.

*To all whom it may concern:*

Be it known that I, ERNST HAAGN, a subject of the German Emperor, and a resident of Hanau, Germany, have invented certain new and useful Improvements in Electric-Resistance Thermometers, of which the following is a specification.

This invention relates to electrical-resistance thermometers by which the well-known property of a wire to alter its resistance by a change of temperature is used for thermometrical purposes. Several measuring instruments which are based on this principle are on the market. Commonly platinum wire is used for this purpose, because platinum is less altered while being incandescent. This platinum wire is commonly wound on a reflecting-strip if low temperatures are to be dealt with, and if high temperatures are to be dealt with it is wound on a clay cylinder, and these windings are embedded into an isolating protecting receptacle. This construction is unsatisfactory to some extent, because the platinum wire is not arranged in intimate contact with the wall of the outer receptacle, and in consequence the heat to be measured must first cross an air-space, which is a bad heat-conductor, and therefore prevents a quick reaction of the instrument. A further disadvantage is that when higher temperatures are to be dealt with the platinum undergoes an, although slight, atomization and oxidation, which is followed by a more or less great alteration of the resistance.

The present invention has the purpose of overcoming these difficulties and to provide an instrument which reacts quickly up to 1,000° centigrade, and in consequence permits a relative accuracy up to 1/1000° even at high temperatures.

The instrument arranged according to my said invention is as follows, reference being had to the accompanying drawings, in which—

Figure 1 is a view of the instrument before the rod and wire are embedded into the outer tube, and Fig. 2 a view of the instrument ready for use after embedding.

The platinum wire $a$, the resistance of which is employed for measuring the temperature, is wound spirally around a quartz-glass rod $b$, when a thin quartz-glass tube $c$ is drawn over the rod and wire and melted or fused onto the same in such a way that no intermediate space is left between them; but the rod $b$ and the tube $c$ are melted or fused together in one piece, completely embedding the wire in the glass. This is effected in the following manner: The narrow tube $c$, drawn over the rod $b$, is evacuated and then softened by heating it to 1,500° centigrade, when it lays itself tightly on the rod $b$ and both melt together. By this arrangement on the one side a very favorable transfer of heat is attained, so that the instrument reacts essentially quicker—that is to say, indicates immediately the temperature of the surrounding space. On the other side an oxidation and atomization of the platinum wire is prevented. A further advantage of this arrangement is found in this, that a much stronger measuring-current can be employed than when the wires lie free, in which case they are heated considerably at a much lower electrical charge, so that faults of measuring are unavoidable. The platinum wire being in its whole length intimately embedded in the quartz-glass it transfers its whole own heat perfectly to the quartz-glass body, so that a heating of the wire is avoided.

In the drawings, $d$ are the ends of the platinum wire, which ends lead to the terminals of the source of electricity and to the measuring instrument.

I claim—

1. The method substantially as hereinbefore described of making an electric-resistance thermometer, which consists in winding a platinum wire spirally on a quartz-glass rod, drawing over the latter a quartz-glass cylinder, and intimately uniting the cylinder-rod and wire by fusing the cylinder and rod together.

2. The method substantially as hereinbefore set forth of making an electric-resistance thermometer, which consists in winding a platinum wire spirally on a quartz-glass rod, drawing over the latter a quartz-glass tube, evacuating the tube, and fusing the tube and rod together, embedding the wire in the glass.

3. As a new article of manufacture an electric-resistance thermometer, consisting of a quartz-glass rod, a platinum wire wound spirally over said rod, and an outer quartz-glass layer, the rod and layer being fused together completely embedding the wire in the glass.

In testimony whereof I have signed my name to this specification in the presence of two subscribing witnesses.

ERNST HAAGN.

Witnesses:
 JEAN GRUND,
 CARL GRUND.